(12) United States Patent
Gaudet

(10) Patent No.: US 7,103,038 B1
(45) Date of Patent: Sep. 5, 2006

(54) SYSTEMS AND METHODS FOR CONVERTING A P PACKET/CYCLE DATAPATH TO A Q PACKET/CYCLE DATAPATH

(75) Inventor: Brian Gaudet, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 947 days.

(21) Appl. No.: 09/895,218

(22) Filed: Jul. 2, 2001

(51) Int. Cl.
  *H04L 12/50* (2006.01)
  *H04L 12/56* (2006.01)
  *G06F 3/05* (2006.01)

(52) U.S. Cl. ............... 370/366; 370/412; 370/428; 710/52

(58) Field of Classification Search ........ 370/412, 370/428, 366, 394, 473, 537, 540; 710/52–53
See application file for complete search history.

(56) References Cited

U.S. PATENT DOCUMENTS

| | | | |
|---|---|---|---|
| 4,556,850 A * | 12/1985 | McBrien | 377/75 |
| 4,907,225 A * | 3/1990 | Gulick et al. | 370/463 |
| 5,220,325 A * | 6/1993 | Ackland et al. | 341/67 |
| 5,365,519 A * | 11/1994 | Kozaki et al. | 370/378 |
| 5,381,409 A * | 1/1995 | Folkert de Vries | 370/392 |
| 5,768,630 A * | 6/1998 | Kim | 710/71 |
| 5,790,786 A * | 8/1998 | Wakeman et al. | 709/249 |
| 6,385,671 B1 * | 5/2002 | Hunsaker et al. | 710/28 |
| 6,421,348 B1 * | 7/2002 | Gaudet et al. | 370/401 |
| 6,509,851 B1 * | 1/2003 | Clark et al. | 341/100 |
| 6,650,638 B1 * | 11/2003 | Walker et al. | 370/389 |
| 2001/0012290 A1 * | 8/2001 | Kanazashi | 370/366 |

* cited by examiner

*Primary Examiner*—Chi Pham
*Assistant Examiner*—Tri H. Phan
(74) *Attorney, Agent, or Firm*—Harrity Snyder, LLP

(57) ABSTRACT

A packet processing system converts a wide bus carrying P packets to a narrower bus that can carry only Q packets, where Q<P. The packet processing system includes a first data path, a queue, a shift register and a control unit. The first data path receives up to P packets during a first processing cycle. The queue stores the P packets in a queue. The control unit shifts a first quantity of data of the P packets into the shift register from the queue and selectively retrieves data from the shift register until a first packet of the plurality of packets is retrieved. The control unit then sends the first packet on a second data path during the first processing cycle.

23 Claims, 4 Drawing Sheets

SYSTEMS AND METHODS FOR CONVERTING A *P* PACKET/CYCLE DATAPATH TO A *Q* PACKET/CYCLE DATAPATH

BACKGROUND OF THE INVENTION

1. Field of the Invention

The present invention relates generally to packet processing and, more particularly, to converting a first data path that carries up to P packets per processing cycle to a second data path that carries Q packets per processing cycle, where Q<P.

2. Description of Related Art

Packet processing systems, including any type of router, server or host that communicates using a packet-switching access mechanism, conventionally receive and process multiple packets in a single system cycle. A packet processing system may include a wide data path for receiving multiple packets in parallel during a single system cycle. Processing the packets at the rate they are received may require multiple instances of processing logic operating in parallel. If the packet processing system receive data path is N bytes wide, and the minimum packet that must be processed is M bytes, then P=N/M instances of the processing logic may be required to process all packets in a given system cycle. For example, conventional Cyclical Redundancy Checking (CRC) may be performed to determine packet data errors.

Multiple instances of processing logic in the packet processing system, however, may have many drawbacks, such as increased power demands and space requirements in the system. In Application Specific Integrated Circuits (ASICs), for example, multiple instances of processing logic utilize valuable area of the ASIC. Multiple elements operating in parallel also increase timing complexity in the system.

To decrease space and power requirements in the packet processing system, it would, thus, be desirable to reduce the instances of the logic required to process multiple packets received during a single system cycle. For example, reduction of the processing logic to, for example, a single instance would significantly reduce space and power requirements. Therefore, to enable the use of a single instance of packet processing logic, there exists a need for systems and methods that can convert a data path carrying P packets per cycle to a data path that carries only Q packets per cycle, such as Q=1 packet per cycle.

SUMMARY OF THE INVENTION

Consistent with the principles of the invention disclosed and claimed herein, these and other needs are addressed by queuing up to P packets per cycle received on a first data path and outputting Q packets per cycle on a second data path, where Q<P. Thus, in one embodiment, the packet processing system may use only a single instance of processing logic, such as, for example, CRC logic to process the P packets.

In accordance with the principles of the invention as embodied and broadly described herein, a method of converting a first data path carrying P packets per processing cycle to a second data path carrying N packets per processing cycle, wherein N<P, includes receiving the P packets during a first processing cycle on the first data path, storing the P packets in a queue; shifting first data from the queue into a shift register, selectively retrieving data from the shift register until a first set of Q packets of the P packets is retrieved, and sending the set of Q packets on the second data path during the first processing cycle.

Another implementation consistent with the principles of the invention may include determining whether the data in the shift register comprises an end-of-packet indicator, a data field, and a start-of-packet indicator; and sending, based on the determination, a first set of Q packets on a second data path during the first processing cycle.

Yet another implementation consistent with the principles of the invention may include converting the P packets on the first data path to a first set of Q packets on the second data path, converting the P packets on the first data path to a second set of Q packets on the second data path, and processing the second set of Q packets on the second data path during a second processing cycle.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide mechanisms that can queue up to P packets per cycle received on a first data path and output Q packets per cycle on a second data path, wherein Q<P. In one embodiment, Q=1, thus, enabling the use of a single instance of packet processing logic to process the received P packets.

Exemplary Packet Processing System

Figure 1:
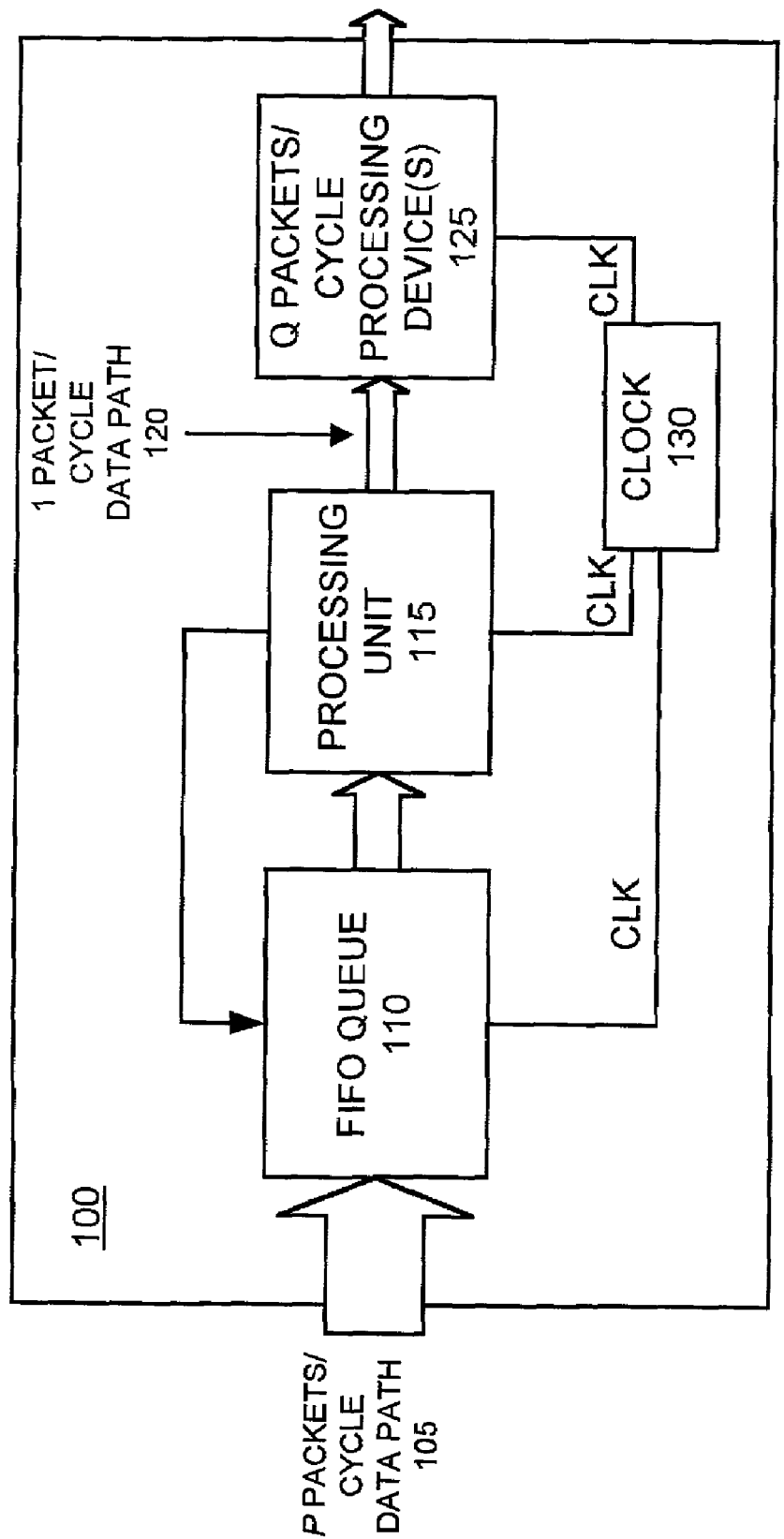
FIG. 1 is an exemplary diagram of a packet processing system consistent with the principles of the invention.

FIG. 1 is a diagram of an exemplary packet processing system 100 that converts a data path that may carry up to P packets per processing cycle to a data path that carries Q packets, such as a single packet, per processing cycle. Packet processing system 100 may reside in, or be connected to, any device that receives or transmits packet data, such as a packet router, a bridge, a switch fabric, or any server or host that handles packets.

Packet processing system 100 may include a data path 105, a FIFO queue 110, a processing unit 115, a data path 120, a processing device(s) 125, and a clock 130. Data path 105 may be N data units, such as N bytes, in width and may include conventional mechanisms for receiving up to P packets per processing cycle and for transmitting the received packets to FIFO queue 110. FIFO queue 110 can receive and store packets received from data path 105 and may include one or more memory devices (not shown).

Processing unit 115 may include a processor that contains instructions for processing data received from FIFO queue 110. Processing unit 115 may alternatively include logic circuitry that performs the equivalent functions of a processor. Processing unit 115 also may include flow control feedback to FIFO queue 110.

Processing device(s) 125 may include a device that processes up to Q incoming packets per processing cycle. For example, processing device(s) 125 may include a Cyclical Redundancy Check (CRC) unit that performs conventional CRC data error checks upon packets received via data path 105. Processing device(s) 125 may also include multiple devices that can each process a maximum of Q packets per cycle, where each of the multiple devices may perform different functions. For example, processing device(s) 125 may include a checksum unit, a CRC unit and a FIFO unit, with each unit processing a maximum of Q packets/cycle, such as 1 packet/cycle.

Clock 130 includes conventional circuitry for supplying clock signals to the components of packet processing system 100. Clock 130 may, for example, supply a clock signal to FIFO queue 110, processing unit 115, and processing device (s) 125.

Exemplary FIFO Queue and Processing Unit

Figure 2:
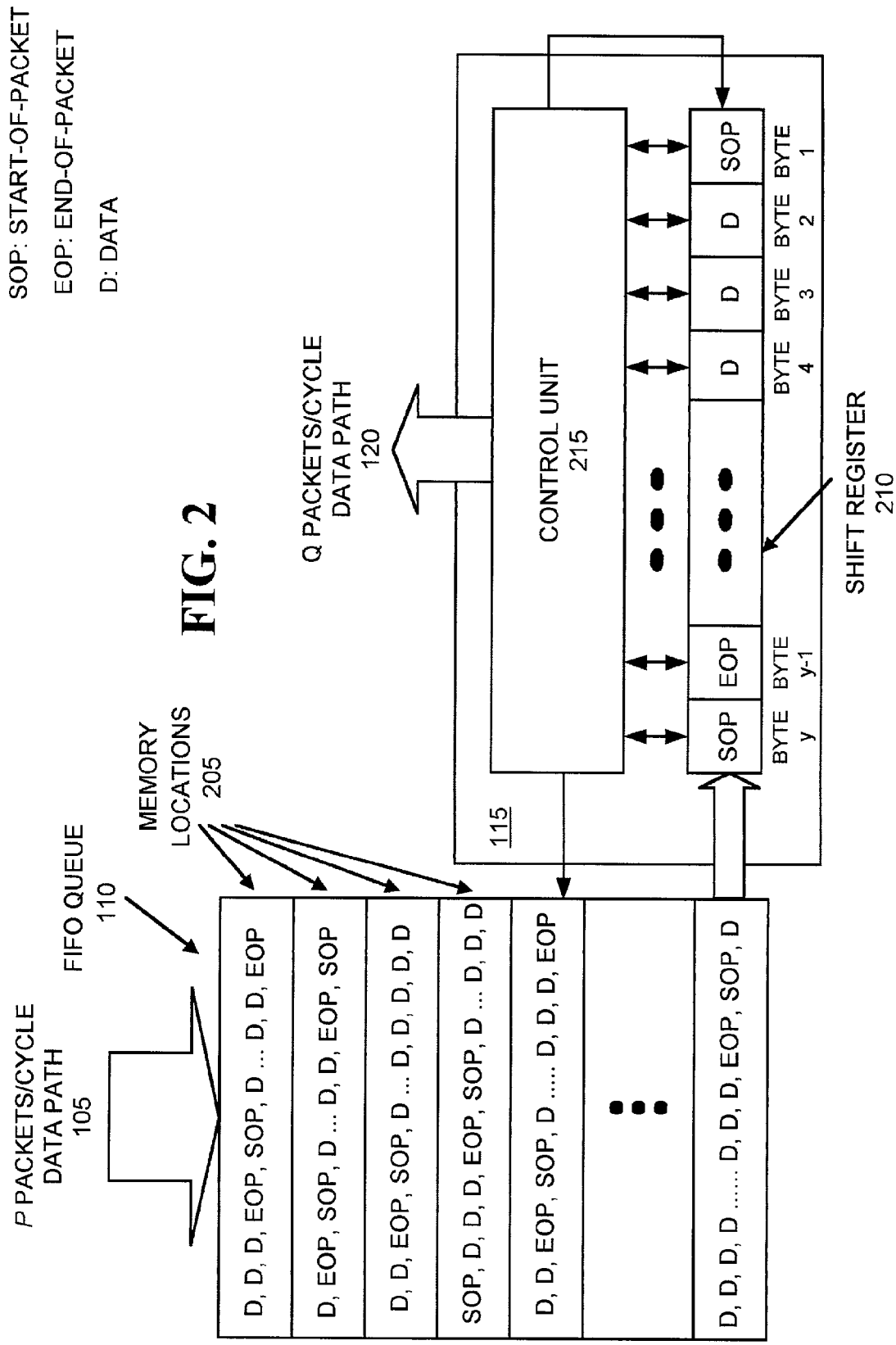
FIG. 2 is an exemplary diagram of the First-in-First-Out (FIFO) queue and processing unit of FIG. 1 according to an implementation consistent with the principles of the invention.

FIG. 2 illustrates exemplary components of FIFO queue 110 and processing unit 115 according to an implementation consistent with the principles of the present invention. FIFO queue 110 may include memory locations 205 for storing bytes of packets received via data path 105. Processing unit 115 may include a shift register 210 and a control unit 215. Shift register 210 may include memory storage units that can right shift individual data units from FIFO queue 110 into shift register 210. Shift register 210 may include memory storage units for storing y data units. Control unit 215 may include a processing device that can retrieve data units from shift register 210 and pass individual packets, composed of the retrieved data units, on data path 120. Control unit 215 may alternatively include logic circuitry that performs the equivalent functions of a processing device.

Exemplary Packet Processing

Figure 3:
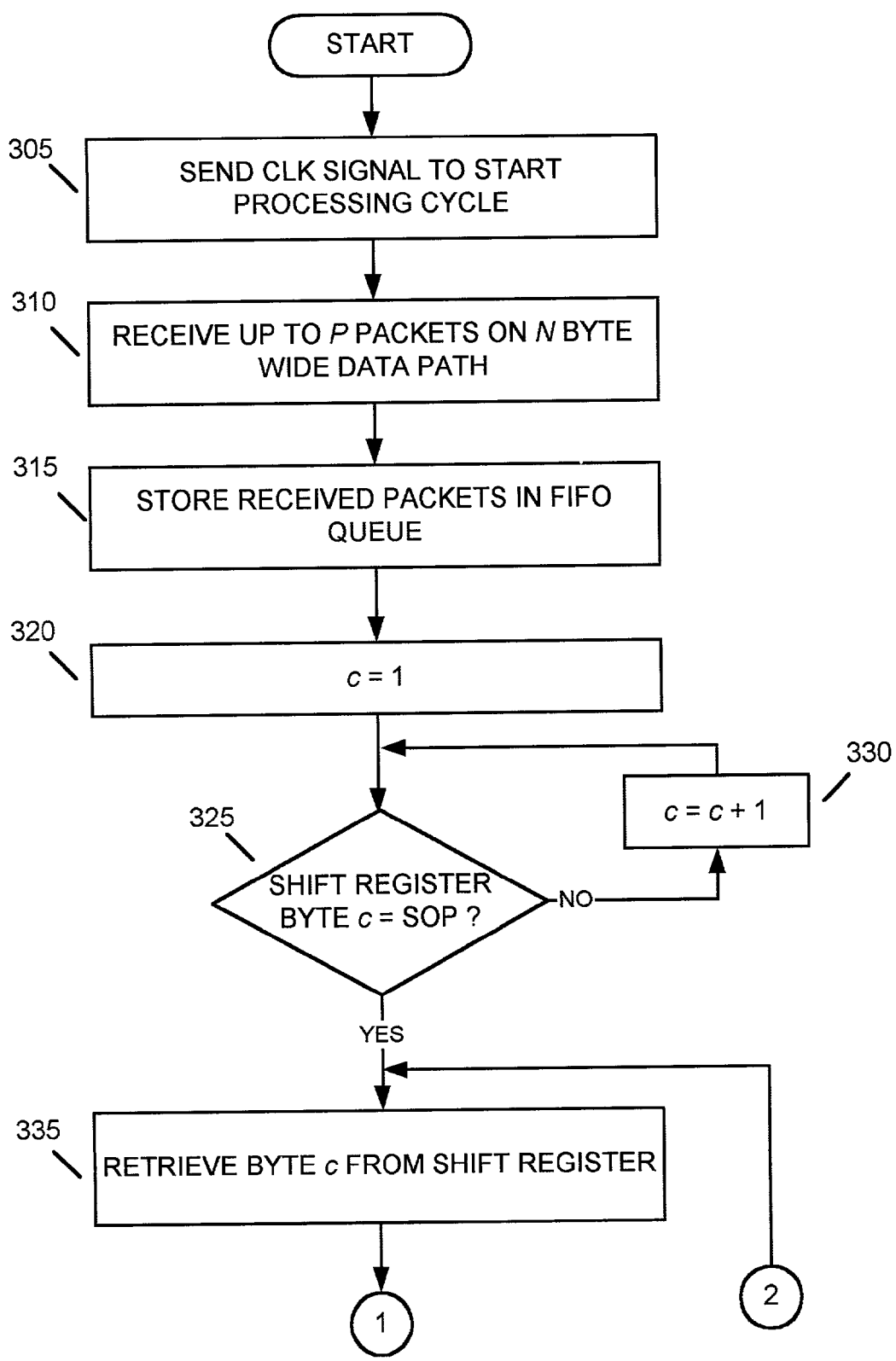
FIGS. 3–4 are exemplary flowcharts of processing by the packet processing system of FIG. 1 according to an implementation consistent with the principles of the invention.
Figure 4:
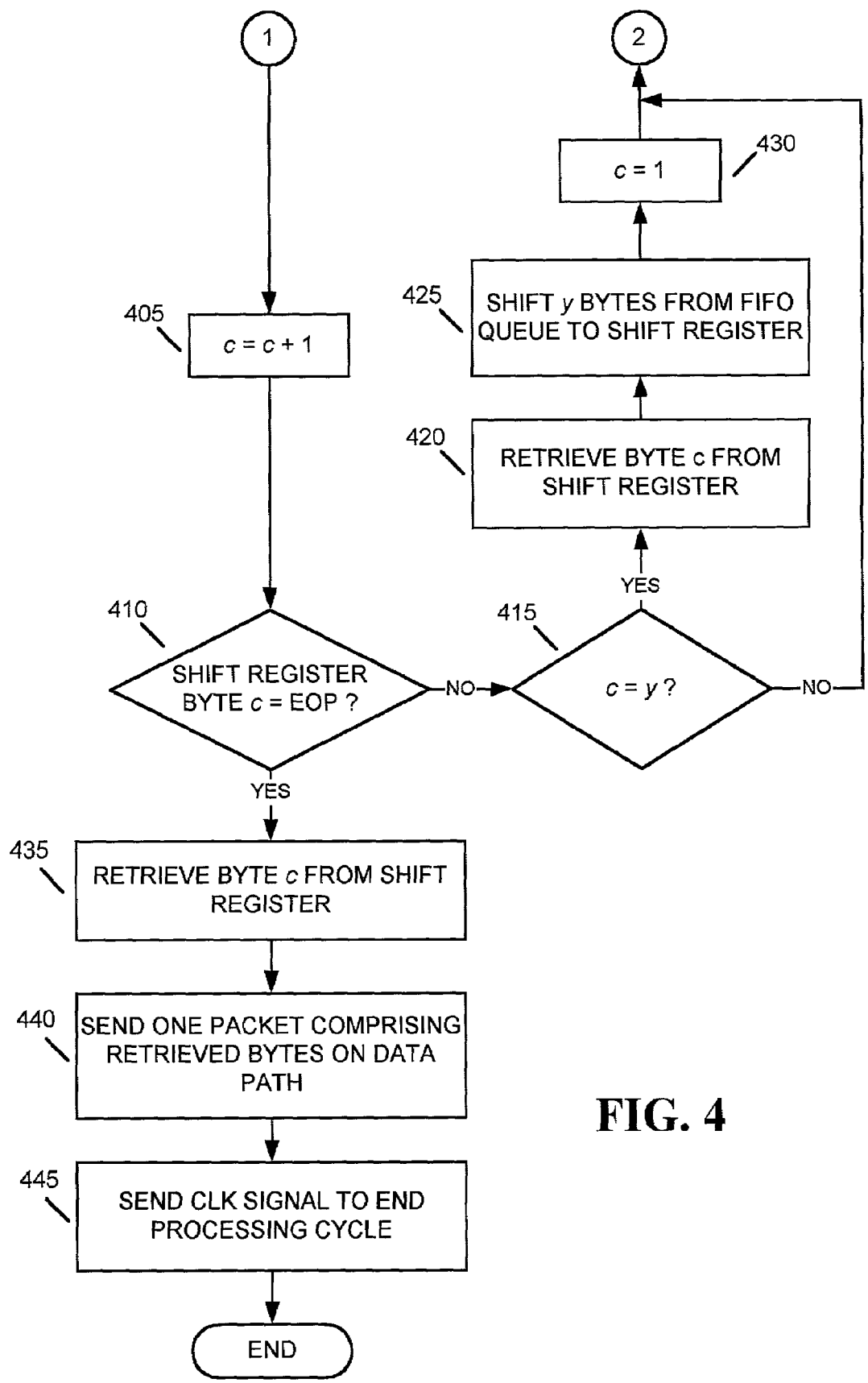

FIGS. 3–4 are exemplary flowcharts of processing by a system, such as packet processing system 100, according to an implementation consistent with the principles of the invention. Processing may begin by sending a clock (CLK) signal to start a processing cycle (step 305). Up to P packets may be received on a N byte data path during the processing cycle defined by the clock signal (step 310). The received packets may be stored in a FIFO queue (step 315). Byte counter c may be set to one (step 320) and it may be determined if byte c of the shift register indicates that it is a first byte of a packet (step 325). For example, byte c may include a start-of-packet (SOP) indicator. If byte c does not include an SOP indicator, the byte counter c may be incremented (step 330), and the process may return to step 325. If the byte c does include an SOP indicator, then byte c may be retrieved from the shift register (step 335).

Turning to FIG. 4, byte counter c may be incremented (c=c+1) (step 405) and it may be determined if byte c in the shift register indicates that it is a last byte of a packet (step 410). For example, the byte may include an end-of-packet (EOP) indicator. If not, then it may be determined whether byte counter c is equal to the byte capacity y of the shift register (step 415). If byte counter c is equal to the maximum byte capacity (y) of the shift register, then byte c may be retrieved from the shift register (step 420) and y bytes may be right shifted from the FIFO queue into the shift register (step 425). Byte counter c may then be reset to one (step 430) and processing may return to step 335. If byte counter c is not equal to the byte storage capacity y of the shift register, then processing may return to step 335.

If byte c of the shift register indicates that it is the last byte of a packet, byte c may be retrieved from the shift register (step 435). A packet may then be sent including the retrieved bytes on a 1 packet/cycle data path (step 440) at, or before, completion of the current processing cycle defined by the clock signal (step 445).

CONCLUSION

Consistent with the principles of the present invention, a data path carrying more than one packet per system cycle may be converted to a data path that carries only Q packets per system cycle, such as 1 packet/cycle. Thus, packet processing may be performed using only a single instance of processing logic, such as CRC logic, to process multiple packets received during a single system cycle.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of steps have been described with regard to FIGS. 3–4, the order of the steps may differ or be performed in parallel in other implementations consistent with the present invention. Use of the "step" in the disclosure is not used in any functional sense, but rather refers to specific acts. Although apparatus, methods and other embodiments consistent with the principles of the invention may process incoming packets and bytes, other units of data may be processed without departing from the spirit and scope of the invention. For example, data entities other then packets can be processed and data units other than bytes can be used to transfer the data entities through the system.

The scope of the invention is defined by the claims and their equivalents.

What is claimed is:

1. A method of converting a first data path carrying P packets per system clock cycle to a second data path carrying Q packets per system clock cycle, wherein Q<P, comprising:
   receiving the P packets during a first system clock cycle on the first data path;
   storing the P packets in a queue;
   shifting first data from the queue into a shift register;
   selectively retrieving data from the shift register until a first set of Q packets of the P packets is retrieved, wherein the data from the shift register is selectively retrieved based on a determination of whether the data comprises one of an end-of-packet indicator, a data field, or a start-of-packet indicator; and
   sending the set of Q packets on the second data path during the first system clock cycle, wherein the second path is coupled to a processing device configured to process a maximum of Q packets per system clock cycle.

2. The method of claim 1, further comprising:
   shifting second data from the queue into the shift register;

selectively retrieving data from the shift register until a second set of Q packets of the P packets is retrieved; and sending the second set of Q packets on the second data path during a second system clock cycle.

3. The method of claim 1, wherein the queue comprises a first-in-first-out (FIFO) queue.

4. The method of claim 1, wherein the processing device comprises a Cyclical Redundancy Checker (CRC).

5. A packet processing system, comprising:
a first data path configured to receive P packets during a first system clock cycle;
a queue configured to store the P received packets;
a shift register;
a control unit configured to:
shift data of the P packets from the queue into the shift register,
selectively retrieve data from the shift register until a first set of Q packets is retrieved, wherein Q<P and wherein the data from the shift register is selectively retrieved based on a determination of whether the data comprises one of an end-of-packet indicator, a data field, or a start-of-packet indicator, and
send the first set of Q packets on a second data path during the first cycle; and
a processing device configured to:
process a maximum of Q packets per system clock cycle received from the shift register via the second data path.

6. A method of converting a first data path carrying P packets per system clock cycle to a second data path carrying Q packets per system clock cycle, wherein Q<P, comprising:
receiving the P packets during a first system clock cycle on the first data path;
storing the P packets in a queue;
selectively shifting one or more first bytes of the P packets from the queue into a shift register;
determining whether the one or more first bytes in the shift register comprises at least one of an end-of-packet byte, a data byte, or a start-of-packet byte; and
sending, based on the determination, a first set of Q packets, comprising at least a portion of the one or more first bytes, on a second data path during the first system clock cycle, wherein the second data path is coupled to a processing device configured to process only Q packets per system clock cycle.

7. The method of claim 6, further comprising:
shifting one or more second bytes of the P packets from the queue into the shift register;
determining whether the one or more second bytes in the shift register comprises at least one of an end-of-packet byte, a data byte, or a start-of-packet byte; and
sending, based on the determination, a second set of Q packets, comprising at least a portion of the one or more second bytes, on the second data path during a second system clock cycle.

8. The method of claim 6, wherein the queue comprises a first-in-first-out (FIFO) queue.

9. The method of claim 6, wherein the processing device comprises a Cyclical Redundancy Checker (CRC).

10. A packet processing system, comprising:
a first data path configured to receive P packets during a first system clock cycle;
a queue configured to store the P packets;
a shift register; and
a control unit configured to:
selectively shift one or more bytes from the queue into the shift register,
determine whether the one or more bytes in the shift register comprises at least one of an end-of-packet byte, a data byte, or a start-of-packet byte, and
send, based on the determination, a first set of Q packets, comprising at least a portion of the one or more bytes, on a second data path during the first system clock cycle, wherein Q<P and wherein the second data path is coupled to a processing device configured to process only Q packets per system clock cycle.

11. A method of processing packets, comprising:
receiving a plurality of packets on a first data path;
converting the plurality of packets on the first data path to a first packet on a second data path;
processing the first packet on the second data path during a first system clock cycle, wherein a processing device that is configured to process only one packet per processing cycle processes the first packet on the second data path during the first system clock cycle;
converting the plurality of packets on the first data path to a second packet on the second data path; and
processing the second packet on the second data path during a second system clock cycle.

12. The method of claim 11, wherein converting the plurality of packets on the first data path to the first packet on the second data path further comprises:
shifting a first quantity of data of the plurality of packets into a shift register;
selectively retrieving data from the shift register until the first packet is retrieved; and
sending the first packet on the first data path during the first system clock cycle.

13. The method of claim 12, wherein converting the plurality of packets on the first data path to the second packet on the second data path further comprises:
shifting a second quantity of data of the plurality of packets into a shift register;
selectively retrieving data from the shift register until the second packet is retrieved; and
sending the second packet on the second data path during the first system clock cycle.

14. The method of claim 12, wherein the data from the shift register is selectively retrieved based on a determination of whether the data comprises at least one of an end-of-packet indicator, a data field, and a start-of-packet indicator.

15. The method of claim 11, wherein the processing device processes the second packet on the second data path during the second system clock cycle.

16. The method of claim 11, wherein the processing device comprises a Cyclical Redundancy Checker (CRC).

17. A packet processing system, comprising:
a first data path configured to receive P packets;
a second data path configured to carry Q packets during a first system clock cycle, wherein Q<P;
a processing unit configured to:
convert the received P packets on the first data path to a first set of Q packets on the second data path during the first system clock cycle,
convert the received P packets on the first data path to a second set of Q packets on the second data path during a second system clock cycle; and
a first processing device configured to process only Q packets per system clock cycle and further configured to:

process the first set of Q packets on the second data path during the first system clock cycle, and process the second set of Q packets on the second data path during the second system clock cycle.

18. A method of processing a plurality of packets using a single packet per system clock cycle processing device, comprising:

receiving the plurality of packets during a first system clock cycle;

storing the plurality of packets in a queue;

selectively shifting one or more first bytes of the plurality of packets from the queue into a shift register;

selectively retrieving the one or more first bytes from the shift register until a first packet of the plurality of packets is retrieved, wherein the one or more bytes from the shift register is selectively retrieved based on a determination of whether the one or more bytes comprises at least one of an end-of-packet byte, a data byte, or a start-of-packet byte; and processing the retrieved first packet during the first system clock cycle, wherein a processing device that is configured to process only one packet per system clock cycle processes the first packet during the first system clock cycle.

19. The method of claim 18, further comprising:

selectively retrieving one or more second bytes from the shift register until a second packet of the plurality of packets is retrieved; and processing the retrieved second packet during a second system clock cycle.

20. The method of claim 18, wherein the queue comprises a first-in-first-out (FIFO) queue.

21. The method of claim 19, wherein the processing device that is configured to process only one packet per system clock cycle processes the second packet during the second system clock cycle.

22. The method of claim 18, wherein the processing device comprises a Cyclical Redundancy Checker (CRC).

23. A packet processing system, comprising:

a first data path configured to receive a plurality of packets during a first system clock cycle;

a queue configured to store the plurality of packets;

a control unit configured to:

selectively shift one or more bytes of the plurality of packets from the queue into a shift register, and selectively retrieve the one or more bytes from the shift register until a first packet of the plurality of packets is retrieved, wherein the one or more bytes from the shift register is selectively retrieved based on a determination of whether the one or more bytes comprises one of an end-of-packet byte, a data byte, or a start-of-packet byte; and a packet processing device configured to process only one packet per system clock cycle and further configured to process the retrieved first packet during the first system clock cycle.

* * * * *